(12) United States Patent
Seccardini et al.

(10) Patent No.: US 8,534,402 B2
(45) Date of Patent: Sep. 17, 2013

(54) MOTOR-VEHICLE WITH AN AUXILIARY COOLING SYSTEM INCLUDING ONE OR MORE RADIATORS CONSTITUTED BY VEHICLE BODY COMPONENTS

(75) Inventors: Riccardo Seccardini, Orbassano (IT); Fabrizio Mattiello, Orbassano (IT); Carloandrea Malvicino, Orbassano (IT); Stefano Re Fiorentin, Orbassano (IT)

(73) Assignee: Società per Azioni, Orbassano (Torino) (IT)

( * ) Notice: Subject to any disclaimer, the term of this patent is extended or adjusted under 35 U.S.C. 154(b) by 267 days.

(21) Appl. No.: 12/953,968

(22) Filed: Nov. 24, 2010

(65) Prior Publication Data

US 2011/0198070 A1    Aug. 18, 2011

(30) Foreign Application Priority Data

Feb. 12, 2010 (EP) .................................. 10425030

(51) Int. Cl.
*B60K 11/04* (2006.01)
(52) U.S. Cl.
USPC .......... 180/68.4; 180/68.1; 180/69.2; 165/41; 165/287
(58) Field of Classification Search
USPC ............. 180/68.4, 68.1, 69.2, 69.24; 165/41, 165/42, 43, 287, 296, 297, 300, 51, 52; 237/12.3 R, 5, 12.4, 28, 43; 123/41.31, 123/41.44
See application file for complete search history.

(56) References Cited

U.S. PATENT DOCUMENTS

| | | | |
|---|---|---|---|
| 5,291,941 A * | 3/1994 | Enomoto et al. ................. | 165/62 |
| 5,531,264 A * | 7/1996 | Eike et al. ......................... | 165/43 |
| 6,164,367 A * | 12/2000 | Kurahashi et al. ............... | 165/42 |
| 6,422,308 B1 * | 7/2002 | Okawara et al. ............... | 165/202 |
| 6,450,275 B1 * | 9/2002 | Gabriel et al. ............ | 180/65.23 |
| 6,467,286 B2 * | 10/2002 | Hasebe et al. .................. | 62/185 |
| 6,505,696 B1 * | 1/2003 | Prevost ........................ | 180/68.4 |
| 6,575,258 B1 | 6/2003 | Clemmer | |
| 6,722,147 B2 * | 4/2004 | Heyl et al. ........................ | 62/244 |
| 7,028,767 B2 * | 4/2006 | Takano et al. ................. | 165/202 |

(Continued)

FOREIGN PATENT DOCUMENTS

| DE | 103 37 869 A1 | | 3/2005 |
|---|---|---|---|
| DE | 10 2004 049 636 | * | 4/2006 |

(Continued)

OTHER PUBLICATIONS

European Search Report for corresponding European Application No. 10425030.3 completed on Aug. 6, 2010, and dated Aug. 16, 2010.

*Primary Examiner* — Katy M Ebner
*Assistant Examiner* — Emma K Frick
(74) *Attorney, Agent, or Firm* — Heslin Rothenberg Farley & Mesiti P.C.; Victor A. Cardona, Esq.

(57) ABSTRACT

A motor-vehicle is provided with an auxiliary cooling system, having a low temperature cooling liquid, entirely independent from the cooling circuit of the engine and including a radiator located at the front part of the motor-vehicle facing the radiator of the cooling circuit of the engine. The auxiliary cooling circuit comprises one or more auxiliary radiators which are connected parallel to the radiator of the auxiliary circuit and which are constituted by motor-vehicle body components.

10 Claims, 5 Drawing Sheets

(56) References Cited

U.S. PATENT DOCUMENTS

| | | | |
|---|---|---|---|
| 7,147,071 B2 * | 12/2006 | Gering et al. | 237/12.3 B |
| 7,207,379 B2 * | 4/2007 | Takano et al. | 165/202 |
| 7,434,611 B2 * | 10/2008 | Wunderlich et al. | 165/202 |
| 7,520,320 B2 * | 4/2009 | Itoh et al. | 165/202 |
| 7,649,273 B2 * | 1/2010 | Zillmer et al. | 290/40 C |
| 7,650,753 B2 * | 1/2010 | Muller et al. | 60/599 |
| 7,753,105 B2 * | 7/2010 | Acre | 165/43 |
| 8,096,611 B2 * | 1/2012 | Maruyama et al. | 296/203.02 |
| 2004/0045749 A1 * | 3/2004 | Jaura et al. | 180/65.2 |

FOREIGN PATENT DOCUMENTS

| | | |
|---|---|---|
| DE | 10 2004 049 636 A1 | 4/2006 |
| GB | 1 281 781 A | 7/1972 |
| WO | 2008/041925 A1 | 4/2008 |

\* cited by examiner

MOTOR-VEHICLE WITH AN AUXILIARY COOLING SYSTEM INCLUDING ONE OR MORE RADIATORS CONSTITUTED BY VEHICLE BODY COMPONENTS

CROSS REFERENCE TO RELATED APPLICATIONS

This application claims priority from European patent application No. 104250303, filed on Feb. 12, 2010, the entire disclosure of which is incorporated herein by reference.

FIELD OF THE INVENTION AND PRIOR ART

The present invention generally refers to motor-vehicle cooling systems and in particular regards motor-vehicles of the type, per se known, comprising both a main cooling system, and an auxiliary cooling system, wherein:

the main cooling system includes an engine cooling circuit passed through by a liquid having relatively high temperature, and including a first front radiator for cooling the liquid coming from the engine, arranged at the front part of the motor-vehicle, and first valve means for enabling the passage of the liquid through said radiator when the temperature of the liquid exceeds a first threshold value, and wherein the auxiliary cooling system includes an auxiliary cooling circuit independent from the engine cooling circuit and entirely outside the engine, said auxiliary cooling circuit being passed through by a liquid having a relatively low temperature and including one or more heat exchangers for cooling one or more auxiliary systems of the motor-vehicle, constituted for example by an intercooler device for cooling the engine supercharger air or by an air conditioning system condenser, said auxiliary circuit further including a second front radiator, also arranged at the front part of the motor-vehicle, for cooling the liquid of the auxiliary circuit.

Motor-vehicles of the type indicated above have already been proposed and they have the advantage of simplifying the components inside the engine compartment and reducing the corresponding overall dimensions, due to the fact that the arrangement of the above-mentioned auxiliary cooling circuit does not compulsorily require providing—at the front part of the motor-vehicle—components that require cooling, such as for example the above-mentioned intercooler device or the air conditioning system condenser.

OBJECT OF THE INVENTION

The object of the present invention is that of obtaining a motor-vehicle which not only maintains the abovementioned advantages, but also increases them, guaranteeing further reduction of the dimensions of the components in the engine compartment and higher cooling efficiency.

Another object of the invention is that of obtaining the desired cooling through a more rational and intelligent arrangement of the components dedicated for such purpose, with the further advantage of particularly reducing the dimensions of the front radiators and an ensuing greater freedom regarding designing the shapes of the motor-vehicle.

Another further advantage of the invention is that of obtaining the above-mentioned advantages through extremely simple and low cost means reducing or at least without considerably increasing the weight of the of the motor-vehicle.

SUMMARY OF THE INVENTION

With the aim of obtaining one or more of the abovementioned objects, the invention has the object of a motor-vehicle having the characteristics indicated at the beginning and also characterized in that:

said auxiliary cooling circuit comprises one or more auxiliary radiators, for cooling the liquid of the auxiliary circuit, each of said auxiliary radiators is made up of a component outside the structure of the motor-vehicle, such as for example the front or rear bonnet, or the roof, or a component of the side, or a portion of the deck, each of said auxiliary radiators is interposed in a main line of said auxiliary cooling circuit, parallel to the abovementioned second front radiator of the auxiliary circuit, said auxiliary circuit comprises second valve means that enable the passage of the liquid of the auxiliary circuit through said second front radiator only when the temperature of the liquid of the auxiliary circuit exceeds a second threshold value.

In a preferred embodiment, the motor-vehicle according to the invention is also characterised in that:

also said main cooling circuit comprises one or more auxiliary radiators, for cooling the liquid of the main circuit, each of said auxiliary radiators is also made up of a component outside the structure of the motor-vehicle, such as for example the front or rear bonnet, or the roof, or a component of the side, or a portion of the deck, each of said auxiliary radiators of the main circuit is interposed in a main line of said main cooling circuit, parallel to the abovementioned first front radiator of the main circuit, said first valve means enable the passage of the liquid of the main circuit through said first front radiator only when the temperature of the liquid of the main circuit exceeds a third threshold value exceeding said first threshold value.

Still according to the invention, each of the body components of the motor-vehicle forming an auxiliary radiator is constituted by an outer metal sheet panel and an inner metal sheet panel juxtaposed and welded along the perimeter with the interposition of sealing material and defining therebetween a chamber which communicates with inlet and outlet connections for the cooling liquid of the auxiliary circuit.

In a preferred embodiment, said inner metal sheet panel (which is preferably made up of aluminium) has a plurality of portions deformed towards the inner chamber of the component, in such a manner to define a distribution of reliefs facing said chamber. Still preferably, said reliefs of the inner panel are at contact with the outer panel, in such a manner to serve as spacers, as well as perturbators of the flow and as stiffening elements.

In a concrete embodiment, the abovementioned auxiliary radiator is constituted by the front bonnet of the motor-vehicle. Due to the respective extension of such component, the required volume of the chamber inside the component may be obtained from a distance between the outer panel and inner panel measuring a few millimeters. Thus flowing through the inner chamber with respect to the bonnet is a "blade" of cooling liquid of the auxiliary circuit which enters into the chamber through an inlet connection and exits therefrom through an outlet connection, the positioning of the inlet and outlet connections being selected in such a manner to obtain the most efficient flow of the liquid through the chamber.

It should be observed that the use of motor-vehicle body components with the aim of obtaining cooling radiators is per se known (see for example DE 102004049636). However, up to date, such solution was conceived solely with reference to the cooling of the liquid of the engine cooling circuit of the motor-vehicle. Studies and experiments performed by the Applicant have instead shown that the maximum advantage in terms of increasing the cooling and rationalisation efficiency in the distribution of components within the engine compartment and reducing the overall dimensions is obtained by combining above-mentioned solution with the fact that the body component forms an auxiliary radiator inserted into an auxiliary cooling circuit of the type described above.

In another embodiment of the present invention, one or more of the above-mentioned auxiliary radiators are arranged under the deck or incorporated thereinto, with the advantage of heating the airflow that flows under the vehicle during movement and thus cause reduction of pressure increasing the vehicle's road grip. Such effect may become particularly advantageous at high speeds and it is for example useable in race cars.

BRIEF DESCRIPTION OF THE FIGURES

Further characteristics and advantages of the invention shall be clear from the description that follows with reference to the attached drawings, strictly provided for exemplifying and non-limiting purposes, wherein.

DETAILED DESCRIPTION OF A PREFERRED EMBODIMENT

Figure 1:
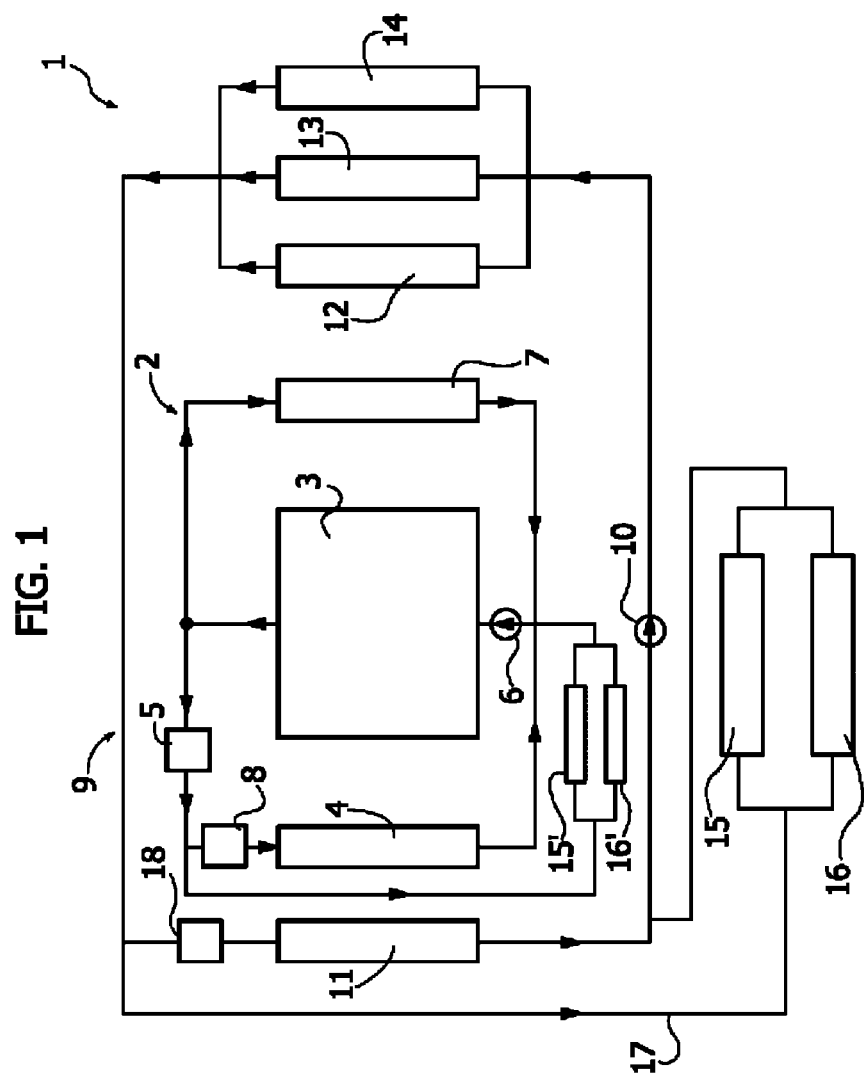
FIG. 1 is a diagram of an embodiment of a cooling system obtained according to the principles of the present invention.
Figure 2:
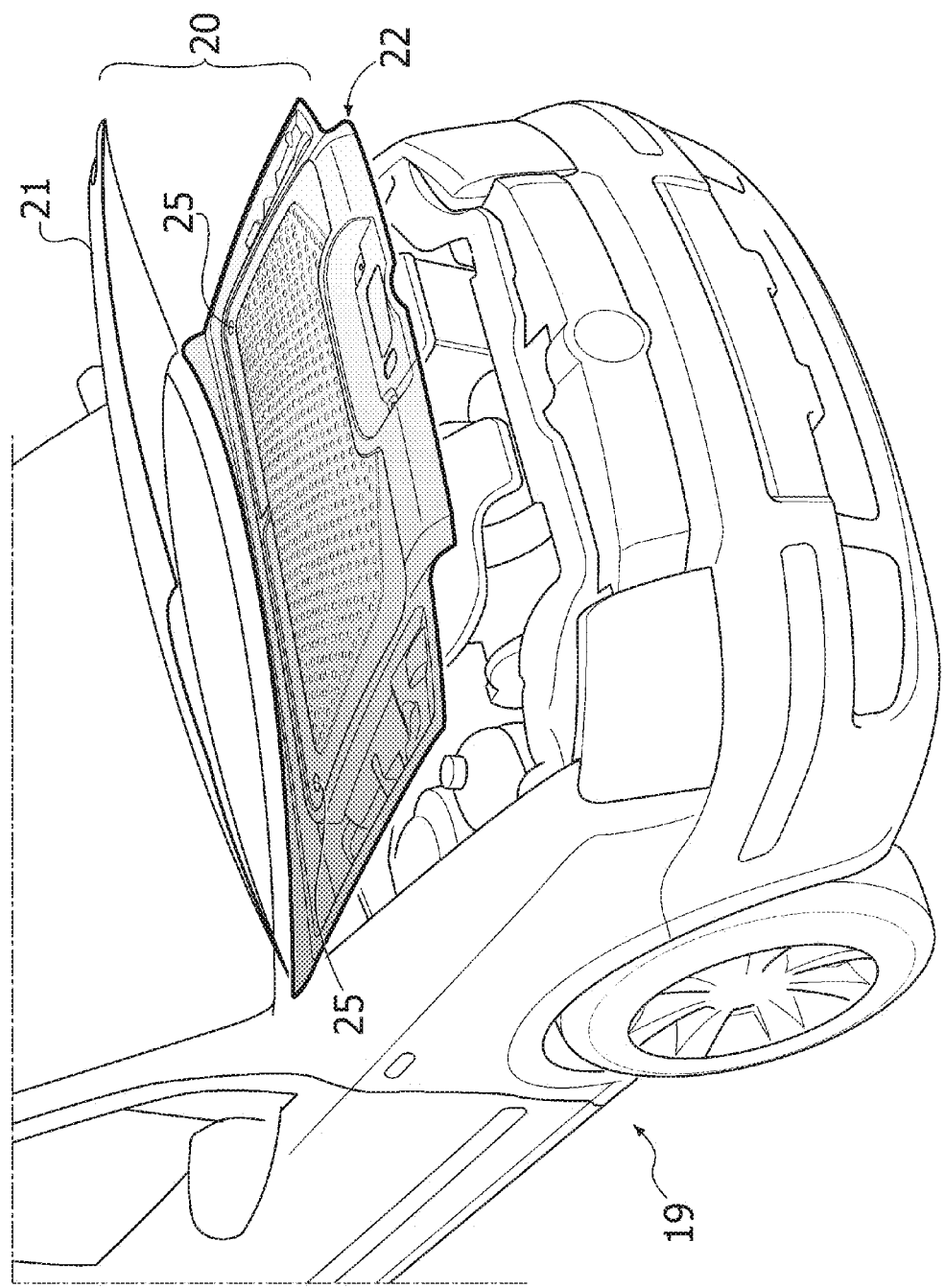
FIG. 2 is a partial perspective view of a motor-vehicle according to the invention, comprising a front bonnet constituting an auxiliary radiator of the low temperature auxiliary cooling circuit or the high temperature main cooling circuit.
Figure 3:
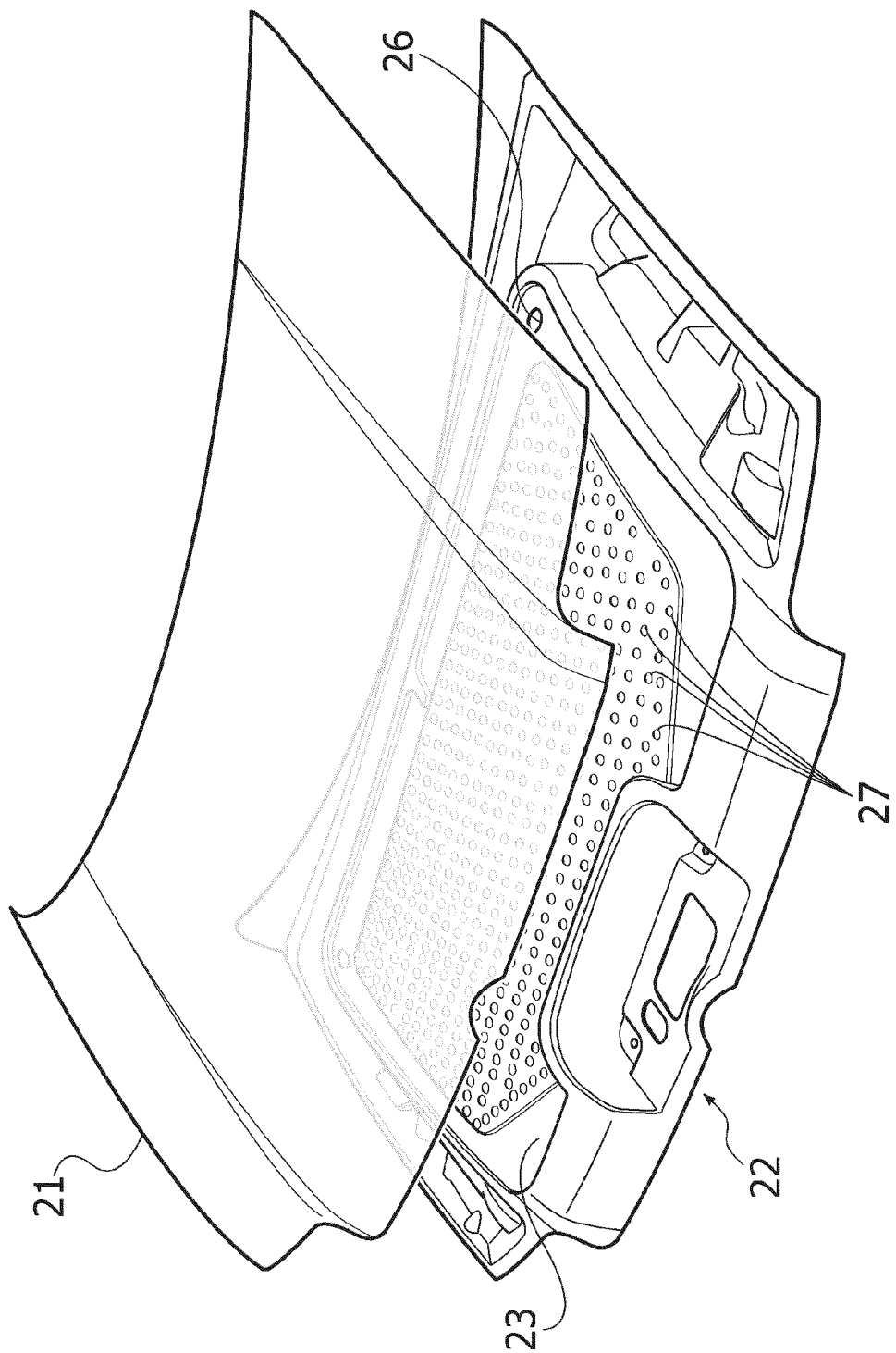
FIG. 3 is a further exploded perspective view of the bonnet of the motor-vehicle of FIG. 2.

In FIG. 1, a cooling system for motor-vehicles obtained according to the principles of the present invention is indicated in its entirety with reference number 1. The cooling system 1 comprises a main cooling system 2, comprising an engine cooling circuit 3 of the motor-vehicle passed through by a cooling liquid which—while the engine is running—has a relatively high temperature, in the order of 90 degrees centigrade. According to the traditional method, outside the engine 3, the main cooling circuit 2 comprises a front radiator 4, positioned at the front part of the motor-vehicle, for cooling the liquid exiting from the engine 3. Valve means 5 enable the passage of the liquid only when the temperature thereof exceeds a threshold value. The valve means 5 may be made up of a thermostat calibrated to open at a predetermined temperature or a valve controlled electronically according to a signal emitted by a temperature probe.

Reference number 6 indicates the pump driven by the engine 3 and intended to activate the circulation of the cooling liquid in the circuit 2.

The main circuit 2 further comprises, still outside the engine 3, a heater 7 for heating the air-conditioning air of the motor-vehicle which is passed through by the cooling liquid exiting from the engine.

The motor-vehicle according to the invention has, alongside the main cooling circuit 2, a secondary or auxiliary cooling circuit 9 totally independent with respect to the main circuit 2 and entirely arranged outside the engine. Intended to pass through the secondary circuit 9 is a cooling liquid which is maintained at a relatively low temperature if compared with the temperature of the liquid that passes through the main circuit 2, for example in the order of 30-45 degrees centigrade. The secondary circuit 9 includes an electrical actuation pump 10 for activating circulation in the circuit 9 and a second front radiator 11, arranged at the front part of the motor-vehicle, facing the radiator 4 of the main circuit 2, to exploit the air that impacts it with the aim of cooling the liquid that passes through the auxiliary circuit 9. The purpose of the secondary circuit 9 is that of allowing the cooling of one or more auxiliary systems arranged in the engine compartment by means of one or more heat exchangers 12, 13, 14 which are connected to each other parallel along the secondary circuit 9. For example the exchangers 12, 13, 14 are constituted by the intercooler device for cooling the engine supercharger air, by the air conditioning system condenser, or even by the exchangers for cooling other components such as electronic exchange units, electric batteries (in case of a hybrid powered vehicle), etc.

According to an important characteristic of the present invention, the secondary cooling circuit 9 also has one or more auxiliary radiators 15, 16 connected parallel to the front radiator 11 of the secondary circuit 9, and which are positioned spaced from such radiator 11. The auxiliary radiators 15, 16 are interposed in the main line 17 of the auxiliary circuit 9, parallel to the front radiator 11. Therefore, the auxiliary radiators 15, 16 are always passed through by the liquid of the auxiliary circuit 9, while the radiator 11 is exploited only when an additional cooling power is required. For such purpose, interposed in the line of the radiator 11 is a valve 18 adapted to enable the passage through the radiator 11 only when the temperature of the cooling liquid of the auxiliary circuit 9 exceeds a threshold value.

Thus, the auxiliary radiators 15, 16 allow the designer to provide for a smaller front radiator 11, offering more design freedom as regards with the front part of the vehicle.

At the same time, according to an important further characteristic of the invention, the abovementioned auxiliary radiators 15, 16 connected parallel with the radiator 11 of the secondary cooling circuit 9 are constituted by motor-vehicle body components, as observable in detail hereinafter.

In a preferred embodiment, even the main circuit 2 is completed with auxiliary radiators 15', 17' (see FIG. 1), also constituted by motor-vehicle body components. Also in this case, the auxiliary radiators 15', 16' are arranged parallel to the front radiator 4 and provided for is a valve 8 immediately upstream of the front radiator 4 which enables the passage of the liquid through such radiator only beyond a threshold value, exceeding the one for which the valve 5 had been calibrated. When the valve 5 is open, the liquid flows normally only through the auxiliary radiators 15', 16', and the valve 8 also opens when extra cooling power is required. Therefore, even in this case the designer is free to use a smaller radiator 4, still to the advantage of freedom when designing the front part of the vehicle.

In the embodiment illustrated in FIGS. 2-5, one of the auxiliary radiators 15, 16, 15', 16' is constituted by the front bonnet of the motor-vehicle.

Referring to the abovementioned FIGS. 2-5, number 19 shows—in a partial perspective view—a motor-vehicle having a front bonnet 20 which itself constitutes the auxiliary radiator 15 connected parallel with the radiator 11 of the cooling system with liquid at low temperature. According to a per se traditional method, the bonnet 20 is constituted by the outer metal sheet panel 21 and an inner metal sheet panel 22 juxtaposed and welded along the perimeter, with the interposition of sealing material.

Figure 4:
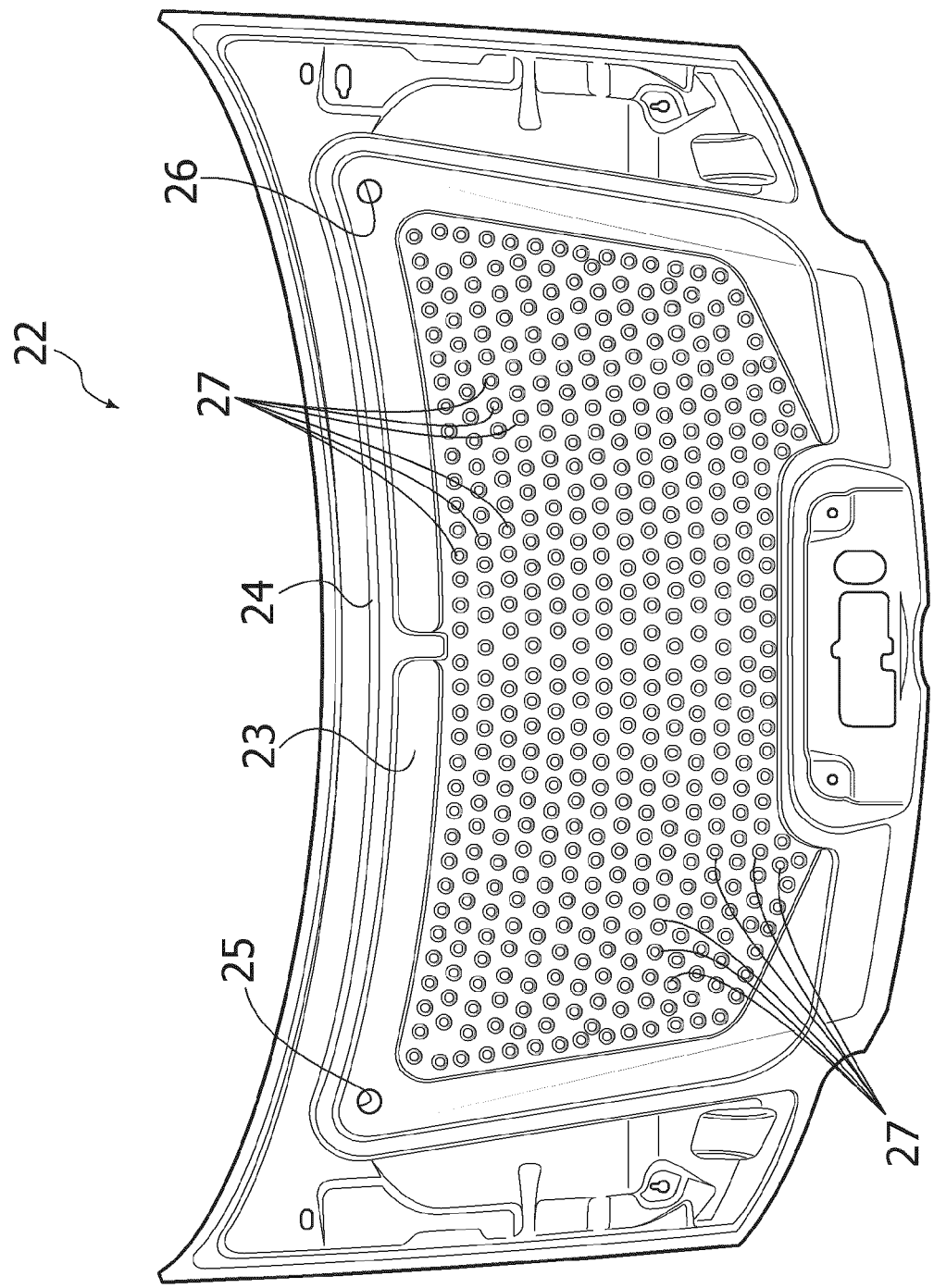
FIG. 4 is a plan view of the inner sheet panel part of the bonnet of FIG. 3.

According to the invention, the inner metal sheet panel 22 (which preferably is made up of aluminium) is however obtained in such a manner to define, alongside the outer panel 21, a closed chamber intended to be passed through by the liquid of the auxiliary cooling circuit 9. Referring to FIG. 4, the inner panel 22 has an inner area 23 delimited by a perimeter edge 24 which defines the abovementioned chamber. Made in the area 23 are two holes 25, 26 intended to serve as inlet and outlet for the liquid. Mounted at such openings 25, 26 are inlet and outlet connections (not illustrated) for connecting the pipes for the passage of the liquid.

Figure 5:
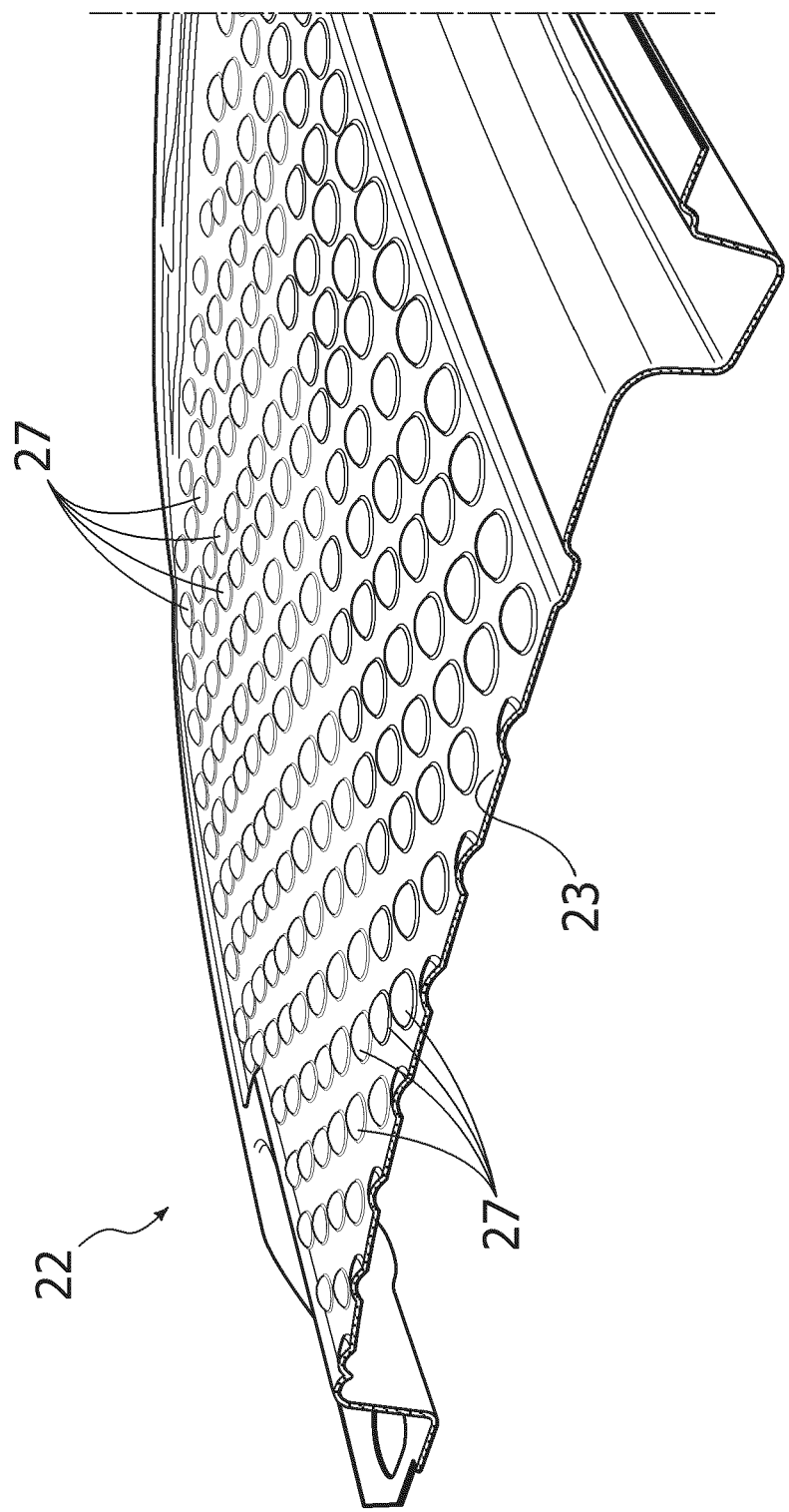
FIG. 5 is a partial perspective and sectional view of the inner sheet panel of FIG. 4.

As clearly observable in the drawings and in particular in FIG. 5, the central area 23 of the inner aluminium sheet panel 22 has an orderly distribution of small deformed portions 27 defining small dome-like reliefs adjacent to the inner chamber of the component. Preferably such reliefs 27 are at contact with the outer panel. Therefore, they have three functions: they determine turbulence in the flow of the liquid through the chamber which increases heat exchange and simultaneously serve as spacer elements between the inner panel 21 and the outer panel 22 and as elements for stiffening the panel 22. Thus, as observable, the distance between the outer panel and inner panel substantially corresponds to the height of the abovementioned reliefs 27, which may be in the order of a few millimetres. As a matter of fact, the respective extension of the area 23 allows obtaining the volume suitable for the inner chamber of the component even with a relatively low height of such chamber, which produces a flow of the liquid through such chamber substantially in form of a flat "blade" of the liquid.

The principles of the present invention are however applicable even to other motor-vehicle body components, such as for example the side components, or roof components or even to parts that are extended beneath the motor-vehicle.

Obviously, without prejudice to the principle of the invention, the details and embodiments may vary, even significantly, with respect to what has been described herein by way of non-limiting example only, without departing from the scope of the present invention.

What is claimed is:

1. A motor-vehicle, comprising:
   a main cooling system, including an engine cooling circuit passed through by a liquid having a relatively high temperature, and including a first front radiator for cooling the liquid coming from the engine, arranged at the front part of the motor-vehicle, and first valve means for enabling the passage of the liquid through said first front radiator only when the temperature of the liquid exceeds a first threshold value,
   said main cooling circuit comprising one of more auxiliary radiators, for cooling the liquids of the main circuit,
   each of said auxiliary radiators of the main circuit interposed in a main line of said main cooling circuit, parallel to the first front radiator,
   said first valve means enabling the passage of the liquid of the main circuit through said first front radiator only when the temperature of the liquid of the main circuit exceeds a third threshold value exceeding said first threshold value,
   an auxiliary cooling system, including an auxiliary cooling circuit independent from the engine cooling circuit and entirely outside the engine, said auxiliary cooling circuit being passed through by a liquid having a relatively low temperature and including one or more heat exchangers, for cooling one or more auxiliary systems of the motor-vehicle,
   said auxiliary circuit further including a second front radiator also arranged at the front part of the motor-vehicle, for cooling the liquid of the auxiliary circuit,
   said auxiliary cooling circuit comprising one or more auxiliary radiators, for cooling the liquid of the auxiliary circuit,
   each of said auxiliary radiators comprising a body component of an exterior structure of the motor-vehicle,
   each of said auxiliary radiators interposed in a main line of said auxiliary cooling circuit, parallel to the abovementioned second front radiator of the auxiliary circuit, and
   said auxiliary circuit comprising second valve means that enable the passage of the liquid of the auxiliary circuit through said second front radiator only when the temperature of the liquid of the auxiliary circuit exceeds a second threshold value.

2. The motor-vehicle according to claim 1, wherein said body component comprises a front hood of the motor-vehicle.

3. The motor-vehicle according to claim 1, wherein said component is configured and arranged in such a manner to heat the airflow that flows beneath the vehicle when moving and thus cause the reduction of pressure therein thus increasing the vehicle's road grip.

4. The motor-vehicle according to claim 1, wherein each of the motor-vehicle body components forming an auxiliary radiator comprises an outer metal sheet panel and by an inner metal sheet panel juxtaposed and welded along a perimeter edge with interposition of sealing material and defining therebetween a chamber which communicates with inlet and outlet connections for the cooling liquid of the auxiliary circuit.

5. The motor-vehicle according to claim 4, wherein said inner metal sheet panel has a plurality of portions deformed towards the inner chamber of the component, in such a manner to define a distribution of reliefs facing said chamber.

6. The motor-vehicle according to claim 5, wherein said reliefs of the inner panel are at contact with the outer panel, in such a manner to serve as spacers, as well as perturbators of the flow and stiffening elements.

7. The motor-vehicle according to claim 6, wherein said inner metal sheet panel has a perimeter edge further inwards with respect to a peripheral edge thereof, said perimeter edge delimits a central area which defines the abovementioned inner chamber alongside the abovementioned outer metal sheet panel, said central area being provided with the abovementioned reliefs and two openings for the inlet and outlet of the liquid of the auxiliary circuit.

8. The motor-vehicle according to claim 1, wherein the one or more heat exchangers comprises an intercooler device for cooling engine supercharger air.

9. The motor-vehicle according to claim 1, wherein the one or more heat exchangers comprises an air conditioning system condenser.

10. The system of claim 1, wherein the one or more heat exchangers comprises a component instrument for cooling at least one of an electronic exchange unit and an electric battery.

* * * * *

UNITED STATES PATENT AND TRADEMARK OFFICE
CERTIFICATE OF CORRECTION

PATENT NO. : 8,534,402 B2
APPLICATION NO. : 12/953968
DATED : September 17, 2013
INVENTOR(S) : Seccardini et al.

It is certified that error appears in the above-identified patent and that said Letters Patent is hereby corrected as shown below:

Title page Assignee item (73): Delete "Società per Azioni" and insert
-- C.R.F. Società Consortile per Azioni --

Signed and Sealed this
Nineteenth Day of November, 2013

Teresa Stanek Rea
*Deputy Director of the United States Patent and Trademark Office*